Patented Nov. 6, 1951

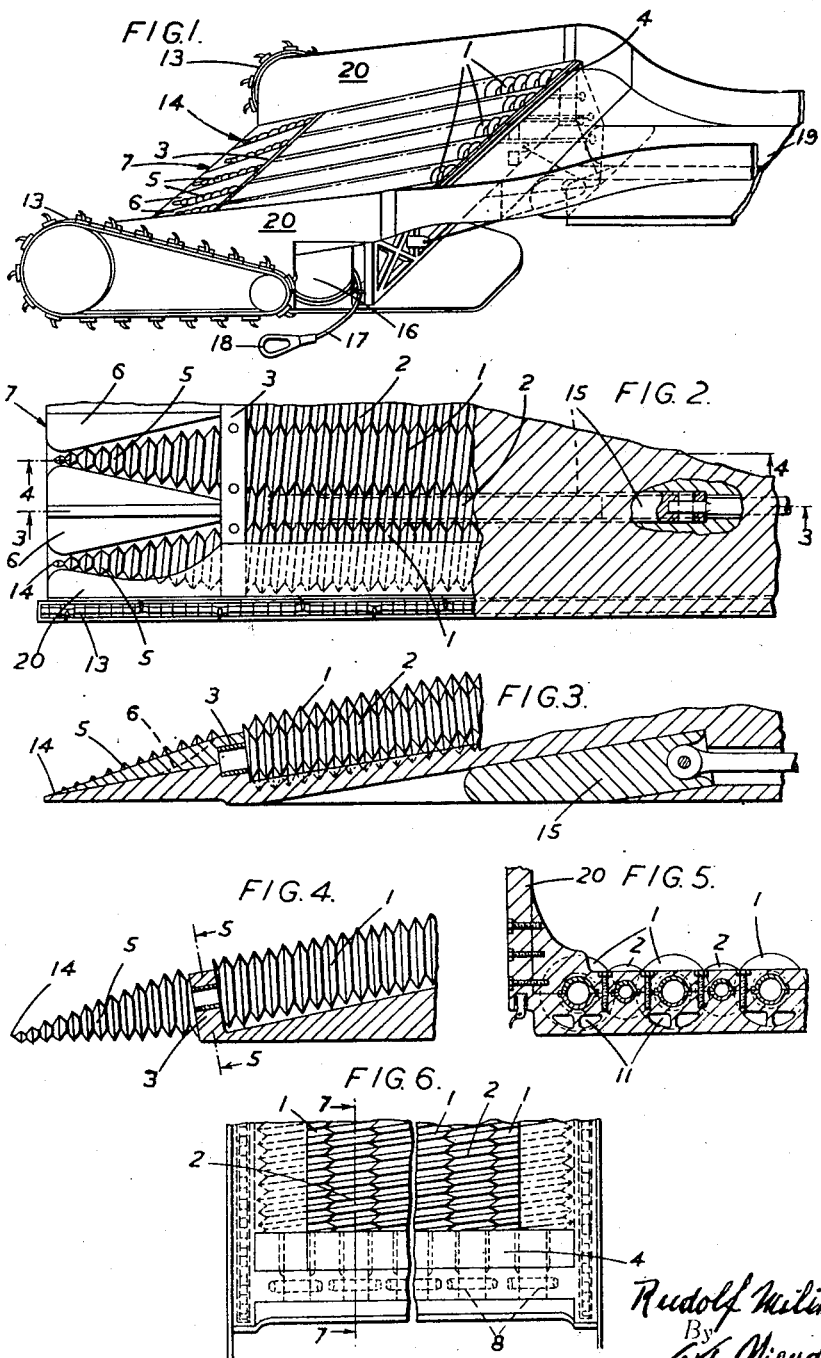

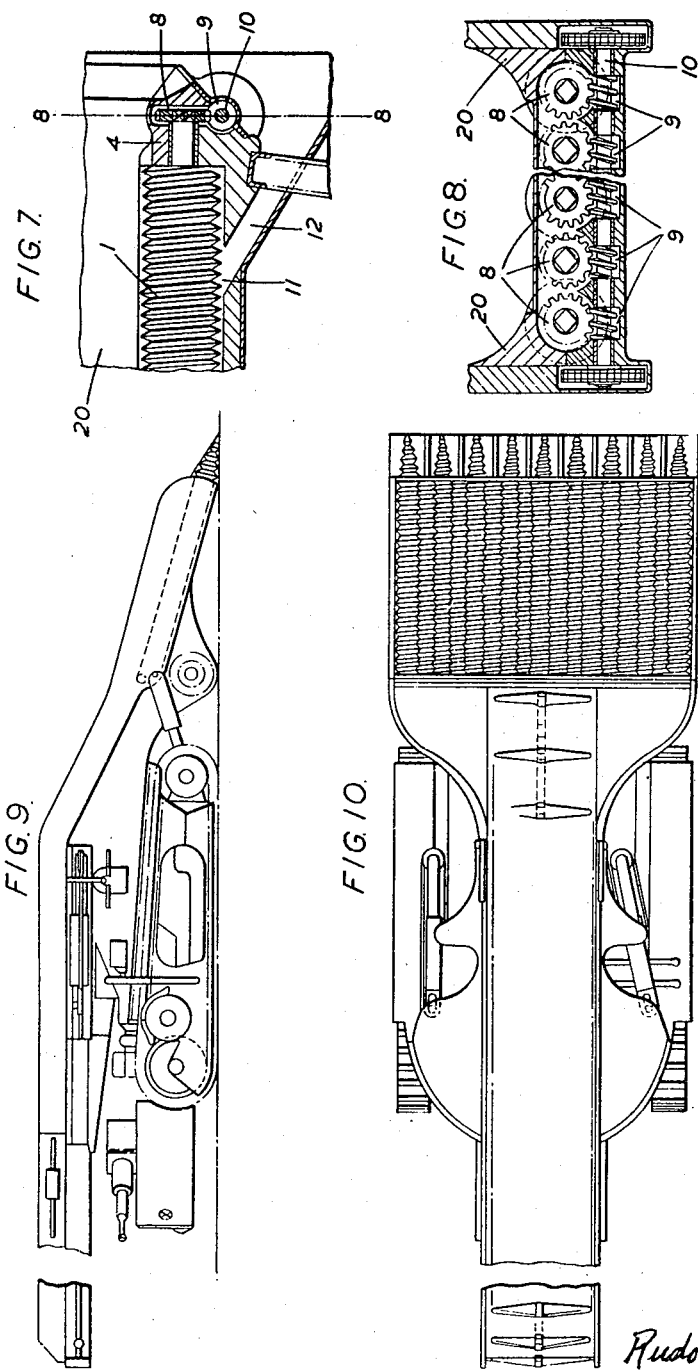

2,574,187

UNITED STATES PATENT OFFICE 2,574,187

LOADING APPLIANCE

Rudolf Milik, London, England, assignor to Milik Conveyors Limited, London, England, a British company Original application April 6, 1945, Serial No. 586,886. Divided and this application July 30, 1947, Serial No. 764,815. In Great Britain December 13, 1944

Section 1, Public Law 690, August 8, 1946
Patent expires December 13, 1964

3 Claims. (Cl. 198—9)

This invention relates to appliances primarily intended for use in handling loose coal in coal mines but applicable also for use in similar operations, such as the removal of slag heaps or mounds of earth or other cases in which loose material has to be picked up at floor level and elevated for loading onto a conveyor or into trucks. The invention is concerned with subject-matter divided from my co-pending application Serial No. 586,886.

One object of the invention is to provide a feeding appliance in the form of a mechanical shovel and loader which can be advanced toward a mass of loose coal, or a heap or mound of other loose material, so that without the employment of manual or any other mechanical assistance the material can be speedily and cleanly elevated.

Another object of the present invention is to provide a mobile shovelling and loading machine in which the shovelling surface is composed of the upper surfaces of a group of parallel intermeshing screws all rotatably mounted on a framework to form a multi-screw conveyor-like bed serving to engage and convey rearwardly any loose material bearing upon it.

In preferred arrangements the mechanical shovel and loader comprises a wedge-shaped frame, the underside of which is positioned substantially horizontally and close to the floor, whilst the upper inclined surface is composed of the surfaces of a group of parallel rotating screws which form a multi-screw conveyor-like bed, the effect of which is to grab and convey rearwardly any load or loose material bearing upon it.

The extreme forward end or nose of this grabbing bed may be constituted by forwardly extending tapered points provided on all of the screws, but preferably on alternate screws only, in which latter case fixed scoops or buckets are employed which are shaped to fill up the tapered spaces between these tapered screw points. The screws may all be of the same size but preferably they consist of two sets differing in size, the screws of the set of one size alternating with those of the set of the other size, the larger screws being the ones that have the tapered points. By using unpointed alternate screws of smaller diameter than the pointer screws a longitudinally grooved upper surface is obtained which facilitates rearward conveyance of the coal or other loose material being loaded.

It will be understood that as this combined shovel and loader removes the coal it is advanced continuously or by stages, and any conveyor or receiving means associated therewith is equally advanced. The gradual advance of the combined shovel and loader may be effected by the hauling action of a power driven winding drum and cable.

In order that the invention may be clearly understood reference will now be made to the accompanying drawings, in which:

Figure 1 is a perspective view of the shovelling surface of the shovel and loader;

Figure 2 is an enlarged fragmentary plan view of the loader screws at the front end of the loader;

Figure 3 is a sectional view on the line 3—3 of Figure 2;

Figure 4 is a sectional view on the line 4—4 of Figure 2;

Figure 5 is a sectional view on the line 5—5 of Figure 4;

Figure 6 is an enlarged fragmentary plan view of the loader screws at the rear end of the loader;

Figure 7 is a sectional view on the line 7—7 of Figure 6;

Figure 8 is a sectional elevation on the line 8—8 and looking to the left of Figure 7; and Figure 9 is a side elevation and Figure 10 is a plan view of a mechanical shovel and loader in accordance with the present invention used in combination with a known form of belt conveyor mechanism suited to surface loading from a coal face.

The main feature of the mechanical shovel and loader illustrated is a group of parallel rods each having a deep screw-threaded surface in constant mesh with screw-threaded surfaces on adjacent rods. The rods are all mounted in a framework and are all rotated in the same direction so as to form a moving platform tending to shift any loose material thereon in the axial direction of the rods. By employing intermeshing screws to compose the conveyor-like bed the loss of coal by reason of dropping between non-meshing, laterally spaced screws or augers is prevented. There are two sets of rods, the rods 1 of one set differing in size from the rods 2 of the other set, the two sizes alternating in position so that a longitudinally grooved bed is obtained. The rods 1, 2 are rotatably mounted in front and rear supporting bars 3, 4 respectively. The larger rods 1 extend beyond a front supporting bar 3 and are each formed with screw threaded cones or tapered points 5. Between these tapered points 5 are located scoops 6 which fill the gaps between the adjacent cones or screwed tapered points 5. Each scoop 6 consequently has a broad leading edge 7 and tapers rearwardly in plan view, the shape of the scoop 6 generally being such that as the loader is advanced each scoop 6 guides loose material, e. g. coal, onto the two adjacent screwed tapered points 5 by which it is flanked. The rods 1, 2 are driven at their rear ends, which extend beyond the rear supporting bar 4 by worm wheels 8 which are all driven in the same direction and at the same angular speed by worms 9 on a common worm shaft 10 driven by an electrical or compressed air motor. The skeleton framework in which the group of screw-threaded rods 1, 2 is mounted and of which the supporting bars 3, 4 form part is flanked by side walls 10 which restrain the material laterally as it advances along the moving bed constituted by the upper exposed surfaces of the screwed rods 1, 2. Any small particles of material that may pass to the underside of the screw rods 1, 2 collect in the troughs 11 (Fig. 5) and are pushed by the screwed surfaces of the rods 1, 2 to the rear ends thereof and finally fall out through chutes 12 (Fig. 7). Cutter chains 13 for seam cutting purposes may be mounted on the sides of the framework, especially when the loader is intended for use in coal mines.

The screw-threaded rods 1, 2 are mounted in the supporting framework at a slight inclination from the horizontal so as to raise the material as it travels rearwardly. The optimum angular working disposition of the cones or tapered points 5 with respect to the floor is with the tips 14 of the cones or tapered points just above the floor and the lowermost portions of every convolution of each cone or point 5 just clear of the floor as shown in Figure 4, that is, the axis of rotation of the pointed screw is normally inclined to the horizontal at an angle substantially equal to one half of the included angle of the tapered point of the screw, but this normal angle of inclination may be varied somewhat by adjusting a wedge member 15 (Fig. 3) to and fro along the underside of the rod-carrying framework; this adjusting mechanism is also useful to facilitate travelling over an uneven floor surface.

The means shown for advancing the above described loader under the loose material comprises a drum 16 (Fig. 1) mounted on the underside of the framework near each rear corner, each drum 16 carrying a cable 17 which is attached to it by one end. The other end of the cable 17 is furnished with a shackle 18 which is adapted to be pegged down some distance in advance of the loader, so that by turning the drums 16 the loader is forcibly advanced. The rate at which the framework is advanced by the winding drums 16 can be regulated to suit requirements and is preferably somewhat less than the rate of rearward travel imposed upon the material by the screw threaded rods 1, 2. Instead of using winding cables 17 and drums 16 for advancing the loader, the loader may be provided with a motor-driven chassis carried on endless tracks.

The rear of the loader framework may be attached (as shown) to the leading end guide roller of an endless conveyor belt 19 so that as the material falls off the rear end of the loader it falls onto the belt 19.

Figures 9 and 10 illustrate how a mechanical shovel and loader constructed in accordance with this invention may be used in conjunction with a known form of transporting mechanism, commonly referred to as a "Joy" loader.

I claim:

1. A mobile shovelling and loading machine comprising a framework, a series of rotatable parallel intermeshing cylindrical screws mounted in said framework, some of said screws having forwardly extending screw-like tapered points, means for driving all of the screws in the same direction of rotation at the same angular speed, said intermeshing screws being rotatably mounted on said framework with their axes of rotation parallel to the normal longitudinal direction of movement of the machine and also normally inclined to the horizontal at an angle substantially equal to one half of the included angle of the tapered point of a screw, thereby constituting an inclined multi-screw conveyor-like bed serving to engage and convey rearwardly any loose material bearing upon it.

2. A mobile shovelling and loading machine according to claim 1, in which alternate screws have forwardly extending tapered points and in which scoops shaped to fill the intervening spaces are fitted between said tapered points.

3. A mobile shovelling and loading machine according to claim 2, in which the alternate pointless screws are smaller in diameter than the pointed screws, thereby providing a longitudinally grooved conveyor-like bed.

RUDOLF MILIK.

REFERENCES CITED

The following references are of record in the file of this patent:

UNITED STATES PATENTS

| Number | Name | Date |
|---|---|---|
| 550,152 | Barr | Nov. 19, 1895 |
| 981,201 | Kuhn | Jan. 10, 1911 |
| 1,197,799 | Covert | Sept. 12, 1916 |
| 1,300,620 | Joy | Apr. 15, 1919 |
| 1,383,593 | Bennett | July 5, 1921 |
| 1,762,154 | Blair | June 10, 1930 |
| 2,073,432 | Von Segebaden et al. | Mar. 9, 1937 |

FOREIGN PATENTS

| Number | Country | Date |
|---|---|---|
| 107,862 of 1917 | Great Britain | July 19, 1917 |